A. G. WATKINS.
WATER POWER PLANT.
APPLICATION FILED JULY 29, 1918.

1,308,649.

Patented July 1, 1919.
4 SHEETS-SHEET 4.

Fig. 4.

Inventor
Arthur G. Watkins

UNITED STATES PATENT OFFICE.

ARTHUR G. WATKINS, OF PHILADELPHIA, PENNSYLVANIA.

WATER-POWER PLANT.

1,308,649.  Specification of Letters Patent.  Patented July 1, 1919.

Application filed July 29, 1918. Serial No. 247,313.

*To all whom it may concern:*

Be it known that I, ARTHUR G. WATKINS, a citizen of the United States, residing at Philadelphia, in the county of Philadelphia and State of Pennsylvania, have invented certain new and useful Improvements in Water-Power Plants, of which the following is a specification.

This invention relates to a water power plant and has for its object to provide means whereby water in streams and rivers may be used for indirectly running a dynamo, operating a pump or for producing power for other purposes.

Another object of the invention is to provide a self-adjusting water power plant.

A still further object of the invention is is to provide in a hydro-power plant means for regulating the flow of water against its water wheels.

A still further object of the invention is to provide in a water-wheel for producing power, a self-adjusting bearing.

With the above and other objects in view, I have invented the device illustrated in the accompanying drawings, in which—

Fig. 4 is a view similar to Fig. 1 of a modification and showing an auxiliary sluice and water wheel attachment.

Figure 1:
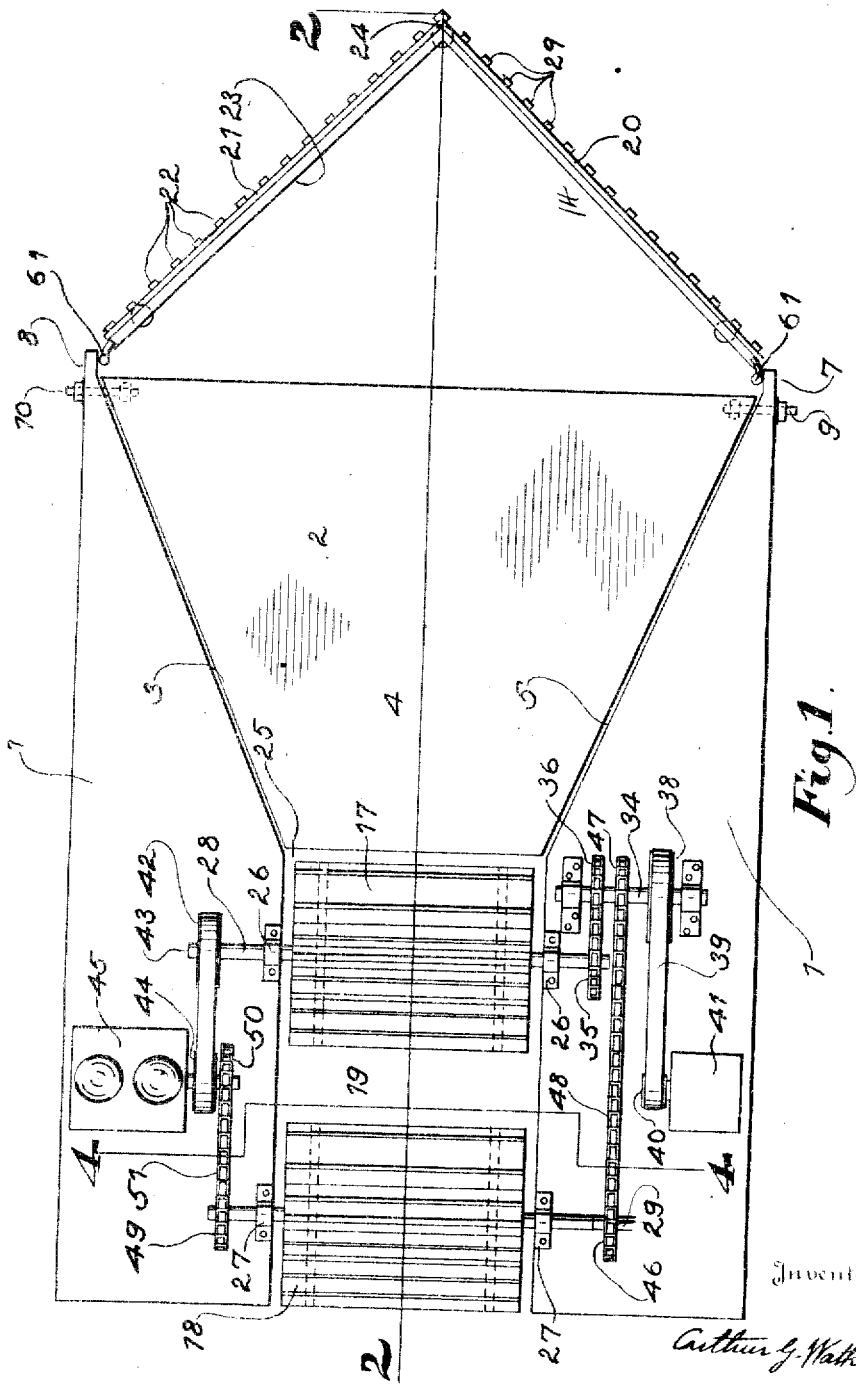
Figure 1 is a top plan view of my hydropower plant.
Figure 2:
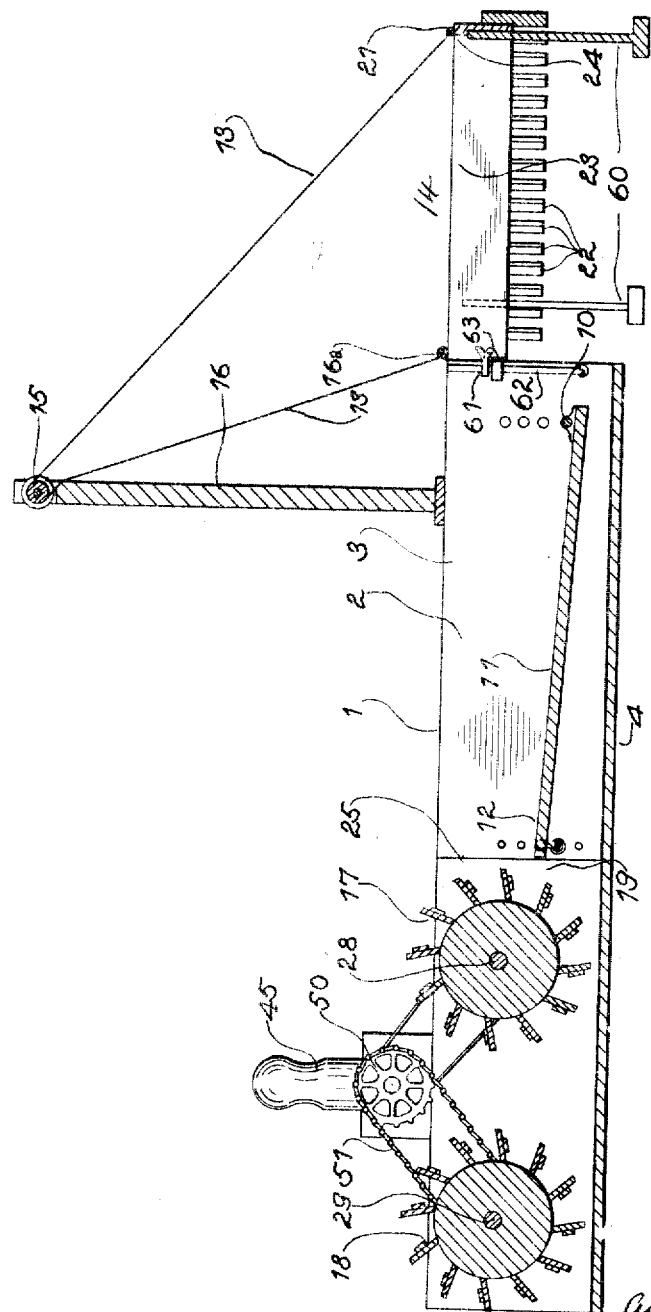
Fig. 2 is a sectional view taken on line 2—2 Fig. 1.
Figure 3:
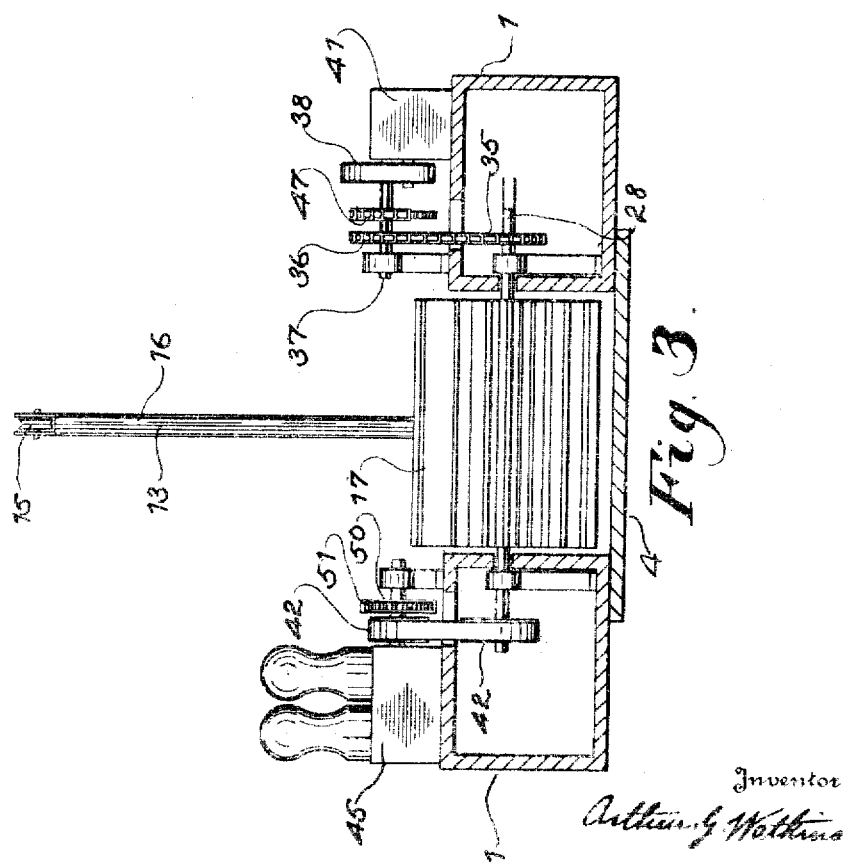
Fig. 3 is a similar view taken on line 4—4 Fig. 1.

Like reference characters indicate like parts throughout the following specification and in the several views in the drawings in which 1 is a float having a funnel shaped water way 2 with inclined walls 3, 4 and 5. To the lower edges 7 and 8 of the walls 3 and 5 is pivotally connected, by means of adjusting bolts 9 and 10, a water deflector 11, the inner end 12 of which is adjustable adjacent the water wheel to regulate the flow of water to the water wheels 17 and 18 operating in the sluice-way 19. The arms 20 and 21 of a V-shaped flood guard and drift catcher 14 are secured to said edges 7 and 8 and to these arms are secured a series of spaced apart vertical rods 22 for preventing drift from entering the water-way 2. To the apex 24 of the flood guard 14 a cable 13 is secured; the cable runs over the pulley 15 on the pole 16 and has its other end fixed to the bar 16ª. A pulley wheel 38 on the shaft 34 will drive a belt 39 which in turn will operate the pulley 40 of dynamo 41. A pulley 42 on the other end 43 of shaft 28 may be connected by belt to a pulley on the shaft 44 operating pump 45. The wheel 18 may be trained to shaft 34 through the wheels 46 and 47 and chain 48, or to pump 45 through wheels 49 and 50 and chain 51.

In Fig. 4 I show a modification of the device in which the float 52 is provided normally with only one water-wheel 53 but which may have secured thereto a detachable sluice-way extension 54 with an auxiliary water-wheel 55 which may be trained on shaft 56 through wheels 57 and 58 and chain 59. It is obvious that as many additional sluice-way extensions as required for a desired purpose may be used. Furthermore a plant may be built originally with as many water-wheels as the particular occasion may require. All of the walls 3, 4 and 5 incline to the reduced opening 25 leading to the sluice-way 19. In flood time the entire plant rises with the tide on floats engaging the flood guard which normally is above surface of water supported by legs 60. This flood guard is provided with eye bolts 61 which are slidable upon the vertical bars 62 whereby the guard is secured to the float 1. Adjustable collars 63 are fixed to the bars 62 so that when the float is raised a certain distance by a high or flood tide the eyes 61 are engaged and the rear end of the gate lifted with the balance of the plant. As plant rises to engage flood guard, cable 13 is tightened, causing the outer end of the flood guard to rise with its rear end.

Another modification shown in Fig. 4 is that of the bearings 26 and 27 for the shafts 28 and 29, these bearings have elongated slots 30 and 31 whereby said bearings have horizontal movement relative to their retaining bolts 32, so that the plant is adaptable to an ebb and flow tide stream, the wheels and their bearings being self adjusting through the direction of flow of the water. The shafts 28 and 29 have gear wheels 33 and 34 operating upon either pinion 35 or 36 according to adjusted position of water wheels, said pinions being fixed to shafts for the transmission of the power.

The water deflector 11 may be so adjustably inclined as to permit any desired flow of water against the water wheels.

Having now described my invention, that which I claim to be new and desire to procure by Letters Patent is:—

1. A water power plant for streams embracing a sluice way, water wheels in sluice way, means on plant for adjusting a V shaped flood guard operative to protect plant in flood times, said means consisting of a means on plant and guard for raising ends of guard adjacent to plant, means on plant and guard for raising outer end of guard, said last means consisting of a cable operating over a pulley on a pole carried by the plant having one end secured to outer end of guard and other end secured to ends of guard adjacent to plant, means for utilizing the power from the operation of said water wheels.

2. A water power plant for streams embracing a sluice-way, a converging waterway leading thereto and water wheels operating in the sluice-way, means for regulating the flow of water passing through the sluice-way, said means consisting of a deflector, hingedly connected to the lower part of the water-way, at its outer end, said water-way having outwardly inclined side walls, means for adjusting said deflector, a V shaped flood guard and a sluice way extension for said plant.

3. A water power plant for streams embracing a sluice-way, a converging waterway leading thereto and water wheels operating in the sluice-way, means for regulating the flow of water passing through the sluice-way, said means consisting of a deflector, hingedly connected to the lower part of the water-way, means for adjusting said deflector, a V shaped flood guard, a sluice way extension for said plant, and a water wheel in said extension.

4. A water power plant for streams embracing a sluice-way, a converging water-way leading thereto and water wheels operating in the sluice-way, means for regulating the flow of water passing through the sluice-way, said means consisting of a deflector, hingedly connected to the lower part of the water-way, means for adjusting said deflector, a V shaped flood guard, means for adjusting said guard, and a V shaped drift catcher.

5. A water power plant for streams embracing a sluice-way, a converging water-way leading thereto and water wheels operating in the sluice-way, means for regulating the flow of water passing through the sluice-way, said means consisting of a deflector, hingedly connected to the lower part of the water-way, a V shaped flood guard, means for adjusting said guard, slotted elongated bearings for water wheel shafts for tide water use and a V shaped drift catcher.

6. A water power plant for streams embracing a sluice-way, a converging water-way leading thereto and water wheels operating in the sluice-way, means for regulating the flow of water passing through the sluice-way, said means consisting of a deflector, hingedly connected to the lower part of the water-way, means for adjusting said deflector, a V shaped flood guard, means for adjusting said guard, slotted elongated bearings for water wheel shafts for tidewater use operative to maintain a constant direction of movement to generator or pump, and means for utilizing the power from the operation of said water wheels.

7. A water power plant for tidewater use embracing a sluice way, converging waterways leading thereto, water wheels operating in the sluice way, means for regulating the flow of water passing through the sluice way, said means consisting of a deflector hingedly connected to the lower part of the waterway, means for adjusting said deflector, slotted elongated bearings for water wheel shafts operative to maintain a constant direction of movement to generator or pump, means for utilizing the power from said wheels and V shaped drift catchers carried on the plant.

8. A water power plant for streams, embracing a flood guard operated by rise and fall of stream, means on the plant for raising ends of guard adjacent to plant.

9. A water power plant for streams embracing a flood guard operated by rise and fall of stream, means on the plant for raising ends of guard adjacent to plant, means on the plant and guard for raising the outer end of guard.

10. A water power plant for streams embracing a flood guard operated by rise and fall of stream, means on the plant for raising ends of guard adjacent to plant, means on the plant and guard for raising outer end of guard, said last means consisting of a cable.

11. A water power plant for streams embracing a flood guard operated by rise and fall of stream, means on the plant for raising ends of guard adjacent to plant, means on plant and guard for raising outer end of guard, said last means consisting of a cable operating over a pulley on a pole carried by the plant, having one end secured to outer end of guard and other end secured to ends of guard adjacent to plant and a V shaped drift catcher.

12. A water power plant for streams embracing a flood guard, means on plant and guard to adjust guard to be controlled by a rising and falling of water in stream, such as in flood times, said means consisting of a cable operating over a pulley on pole carried by the plant, having one end secured to the outer end of guard, other end secured to guard adjacent to plant, adjustable legs on guard, and a V shaped drift catcher carried on the plant.

ARTHUR G. WATKINS.